Dec. 11, 1923.

H. F. TOWNER 1,477,089

ATTACHMENT FOR TRACTORS

Filed Sept. 24, 1921

Inventor
Heber F. Towner

By Frederick Whyper

Attorney

Dec. 11, 1923.
H. F. TOWNER
ATTACHMENT FOR TRACTORS
Filed Sept. 24, 1921
1,477,089
2 Sheets-Sheet 2
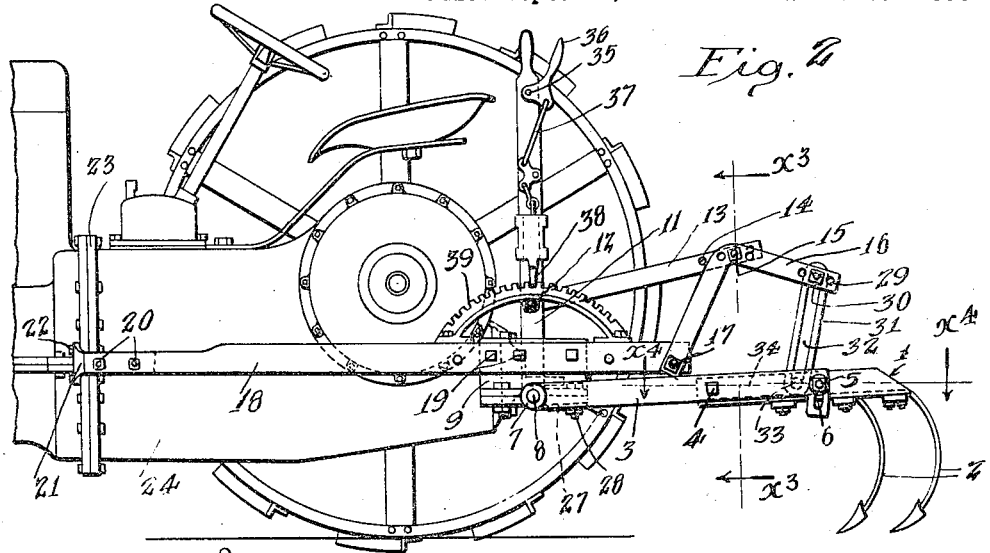
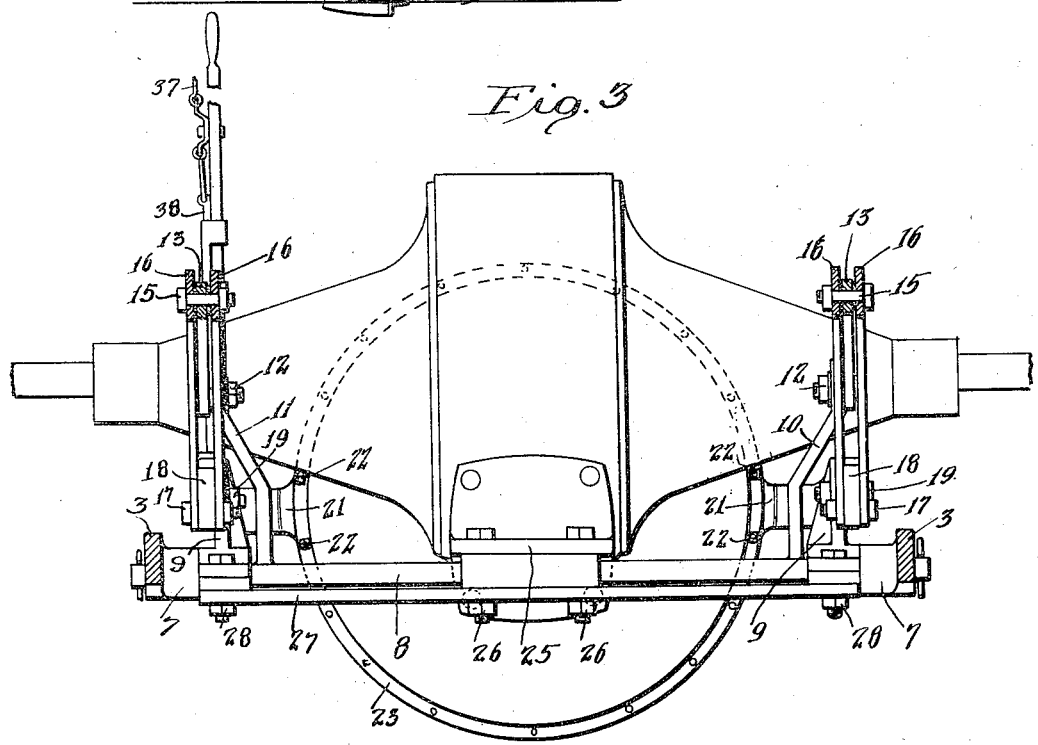
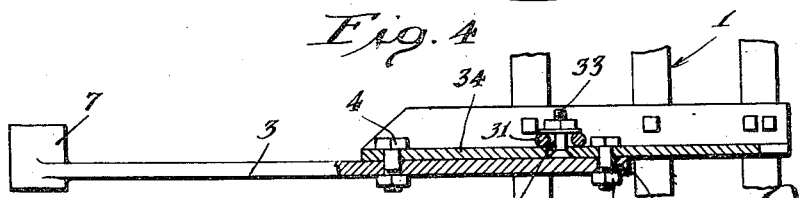
Inventor
Heber F Towner
By Frederick B Lyon
Attorney Patented Dec. 11, 1923.

1,477,089

UNITED STATES PATENT OFFICE.

HEBER F. TOWNER, OF SANTA ANA, CALIFORNIA.

ATTACHMENT FOR TRACTORS.

Application filed September 24, 1921. Serial No. 502,845.

*To all whom it may concern:*

Be it known that I, HEBER F. TOWNER, a citizen of the United States, and a resident of Santa Ana, in the county of Orange and State of California, have invented certain new and useful Improvements in Attachments for Tractors, of which the following is a specification.

This invention relates to draft attachments of the character employed for connecting ground working tools to a tractor, and an object of the invention is to provide an attachment of this character capable of raising and lowering the ground working tools.

Another object is to provide a construction that will insure against forcing the ground working tools deeper into the earth when the tractor wheels descend into a gully or depression in the earth.

Another object is to provide for retraction of the ground working tools by backing of the tractor.

Another object is simplicity of construction and reliability of operation.

The accompanying drawings illustrate the invention:

Figure 1 is a plan view of the invention attached to a tractor, of which the forward portion is broken away to contract the view.

Figure 2 is a front elevation of Figure 1, omitting the near traction wheel.

Figure 3 is an enlarged fragmental rear elevation partly in section on line indicated by $x^3-x^3$, Figure 2, the wheels being omitted.

Figure 4 is an enlarged fragmental plan detail, partly in section, on the line indicated by $x^4-x^4$, Figure 2.

A suitable transversely extending frame 1 is provided for carrying the ground-working implements or tools, a type of which is indicated at 2. It is understood that any form of ground-working tools may be attached to the frame 1. The frame 1 is provided with spaced forwardly-extending arms 3 which are secured by bolts 4, 5 to the frame. Each bolt 5 passes through a slot 6 in the arm 3 so that the frame can be adjusted up or down relative to the arms, the bolts 4 acting as pivots. Such adjustments are for the purpose of changing the angle of the tools relative to the surface of the field. When the bolts 5 are tightened, the frame is securely held in the adjusted position.

The forward ends of the arms 3 are provided with bearings 7 which are mounted on the outer ends of a fixed shaft 8 supported by angle brackets 9. On the shaft is fixed a pair of arms 10, 11 which are pivoted at 12 to rearwardly extending connecting rods 13. The connecting rods 13 are provided near their rear ends with series of holes 14 in which may be adjustably positioned bolts 15 that connect the rods 13 to angular levers 16. Said levers 16 are pivoted at their forward ends at 17 to draft bars 18 and to said draft bars the brackets 9 are secured by bolts 19.

The forward ends of the draft bars 18 are fastened by bolts 20 to angle connections 21 that, in turn, are bolted at 22 to the flange 23 of the transmission housing 24 of the tractor with which the attachment is to be used. In practice, two of the flange bolts on opposite sides of the transmission housing 24 will be removed and the longer bolts 22 substituted therefor for securing the angle connections 21 to the flange. The tractor shown in the drawings belongs to a small well-known type and, as is customary, is provided with a draw bar cap 25. Secured near its middle by bolts 26 to the draw bar cap 25 is a transversely extending bar 27 to which the brackets 9 are secured by bolts 28. The bars 18 are thus not only secured at their forward ends to the tractor, but are also connected intermediate of their ends to the draw bar cap 25, the draft of the implement frame thus being mainly transmitted to the draw bar cap, and the transmission housing resisting lateral and up and down motion of the bars 18. The draft bars 18 are thus rigidly secured to the tractor and extend rearwardly thereof to support the shaft 8.

The levers 16 are provided at their rear ends with series of holes 29 in which may be adjustably positioned bolts 30. In the instance shown in the drawings, each lever 16 comprises a pair of spaced members and the bolts 30 extend through both members. Intermediate of the members of each lever 16 is a link 31, the slot 32 of which is engaged by the bolt 30. The slots 32 of the links are also engaged by bolts 33 secured to upright flanges 34 of the frame 1 and projecting inwardly from said flanges. The links 31 thus loosely connect the levers 16 to the implement frame 1. The rear ends of the levers 16 overhang the bolts 33 so that the links 31 are nearly vertical.

The arm 10 is just sufficiently long to pivotally connect the associated connecting rod 13 with the shaft 8, but the other arm 11 extends above the pivot 12 and forms an operating lever and to said lever is pivoted at 35 a release lever 36 which is connected by the usual linkage 37 to a detent 38 adapted to engage a notched quadrant 39 so that the lever 11 may be held in different positions of adjustment. The quadrant 39 is mounted on one of the draft bars 18. From the foregoing, it will be clear that when the lever 11 is moved forward it swings the levers 16 forwardly and upwardly so as to raise the implement frame and that a reverse motion of the lever 11 will lower the implement frame.

In actual operation, assuming that the lever 11 is in its forward position, thus holding the ground-working tools above the earth, to lower the same to the position shown in Figure 1 the operator will release the lever 11 from the quadrant and allow the plows to penetrate to the desired depth in the earth. He will then permit the detent 38 to engage the quadrant to hold the lever 11 in the adjusted position.

In working on a field with a tractor, it frequently happens, especially where the ground is particularly uneven, that the wheels of the tractor descend into a hollow. When this occurs, if there were a rigid connection between the adjusting lever and the implement frame, there would be a tendency for the tractor to push the ground-working tools deeper into the earth. With the construction above described, when the tractor descends into the hollow, the resistance of the earth to further penetration of the ground-working tools, together with the practically direct pull on the implement frame, will tend to cause the plows to travel in a horizontal path and not descend deeper into the earth, and this is permitted becauses of the provision of the links 31, said links forming a loose connection so as to prevent penetration of the ground-working tools below a predetermined depth and at the some time permitting the rear end of the tractor tilting toward the earth without forcing the tools deeper into the earth. Furthermore, it is seen that the loose connections between the frame and levers 16 permit the frame to rise relative to the levers irrespective of the positions to which said levers may be adjusted.

Another advantage of the loose connection afforded by the links 31 is that if the tractor should become stalled, owing to the high resistance of the earth to forward travel of the ground-working tools, backing of the tractor will immediately cause the ground-working tools to be thrust upwardly out of the earth. Also, such backing of the tractor will aid the operator in withdrawing the tools from the earth, when he so desires.

I claim:

1. In an attachment for tractors, the combination of an implement frame, draft bars adapted for rigid connection with a tractor, arms extending forward from the frame and pivotally connected with the draft bars, levers pivotally mounted on the rear ends of the draft bars, means to hold said levers in different positions of adjustment, and connections between the frame and said levers.

2. In an attachment for tractors, the combination of an implement frame, draft bars adapted for rigid connection with a tractor, arms extending forward from the frame and pivotally connected with the draft bars, angular leers pivotally mounted on the rear ends of the draft bars, means to hold said levers in different positions of adjustment, and connections between the frame and said levers.

3. In an attachment for tractors, the combination of an implement frame, draft bars adapted for rigid connection with a tractor, arms extending forward from the frame and pivotally connected with the draft bars, levers pivotally mounted on the rear ends of the draft bars, means to hold said levers in different positions of adjustment, and loose connections between the frame and said levers permitting the frame to rise relative to the levers irrespective of the positions of said levers.

4. In an attachment for tractors, the combination of an implement frame, draft bars adapted for rigid connection with a tractor, arms extending forward from the frame and pivotally connected with the draft bars, angular levers pivotally mounted on the rear ends of the draft bars, means to hold said levers in different positions of adjustment, and loose connections between the frame and said levers permitting the frame to raise relative to the levers irrespective of the positions of said levers.

5. In an attachment for tractors, the combination of an implement frame, draft bars, means for rigidly connecting the draft bars with a tractor, arms extending forward from the frame and pivotally connected with the draft bars, angular levers pivoted to the rear ends of the draft bars and projecting upwardly and rearwardly, connecting rods pivoted at their rear ends to the intermediate portions of the levers, an operating lever pivotally connected with one of the draft bars and pivoted to one of the connecting rods, means to hold the last lever in different positions, and links connecting the first levers to the frame.

6. In an attachment for tractors, the combination of draft bars, a transverse bar for connecting the draft bars to the draw bar cap of a tractor, means on the forward ends of the draft bars, for connecting said bars to the transmission housing of the tractor, an implement frame, means pivotally connecting the frame to the draft bars, and means mounted on the draft bars to raise and lower the frame.

7. In an attachment for tractors, the combination of an implement frame, draft bars adapted for rigid connection with a tractor, arms extending forward from the frame and pivotally connected with the draft bars, levers pivotally mounted on the draft bars rearwardly of the pivot of the arms, means to hold said levers in different positions of adjustment, and connections between the frame and said levers.

Signed at Los Angeles California this 16th day of September.

HEBER F. TOWNER.

Witnesses:
LEONARD S. LYON,
L. BELLE WEAVER.